United States Patent Office 3,410,891
Patented Nov. 12, 1968

3,410,891
NOVEL THYRONINE DERIVATIVES
George M. K. Hughes, Waterford, and Gerald D. Laubach, Lyme, Conn., assignors to Chas. Pfizer & Co., Inc., New York, N.Y., a corporation of Delaware
No Drawing. Continuation-in-part of application Ser. No. 336,104, Jan. 7, 1964. This application Feb. 10, 1966, Ser. No. 526,340
9 Claims. (Cl. 260—471)

ABSTRACT OF THE DISCLOSURE

Derivatives of β-[4-(substituted phenoxy)phenyl]-α-(lower)alkyl substituted-α-alanine, and racemic, D-, L-modifications, esters, amides and salts thereof, the preparation thereof and the utility thereof as hypolipemic agents.

---

This application is a continuation-in-part of previously copending and now abandoned application Ser. No. 336,-104 of Jan. 7, 1964, the latter application in turn being a continuation-in-part of now abandoned application Ser. No. 255,669 of Feb. 1, 1963.

This invention relates to a novel series of β-[4-(substituted phenoxy)phenyl]-α-(lower)alkyl substituted-α-alanine derivatives, to their racemic, D-, and L-modifications, and to the esters, amides and non-toxic, pharmaceutically-acceptable salts thereof. It further relates to certain novel intermediates of value in their preparation.

The increasing awareness of elevated serum lipids as a predisposing condition for atherosclerosis has led to an intensive search for agents that will effectively and safely lower these lipids, particularly cholesterol.

The hypolipemic or antihypercholesterolemic activity of thyroxine and of various nuclear substituted derivatives thereof and of various nuclear substituted thyronine derivatives is well known. However, these compounds are accompanied by one or more undesirable side effects, particularly antigoitrogenic activity, and/or unfavorable calorigenic response, that is, use of the drug is accompanied by an increase in basal metabolic rate; and instability to metabolic degradation (deamination). Although certain of the known thyroxine and thyronine derivatives mentioned above reportedly possess advantageous ratios of hypolipemic-calorigenic activity or of hypolipemic-antigoitrogenic activity, none of them are resistant to metabolic degradation, in particular, to deamination.

Previous attempts to overcome the above noted deficiencies have, for the most part, been directed to modifications of the substituent groups in the phenoxyphenyl moiety of thyroxine and thyronine. While such modifications have affected the hypolipemic, antigoitrogenic or calorigenic activity to a degree none have successfully overcome metabolic degradation by deamination. Additionally, further study in this area has led to modifications in the α-amino alkanoic acid moiety, e.g., the α-amino propionic acid moiety, and to the development of thyroxine-type compounds (thyronines) in which this portion of the molecule is replaced by a propionic, or acetic acid moiety. Such compounds are also deficient in one or more of the above cited areas of activity.

It is interesting to note that deamination of thyroxine and its analogs leads to compounds having less preferential activity of lowering lipid levels relative to calorigenic activity. This has been adequately demonstrated by Boyd et al. (Brit. Med. Bull., 16, 138, 1960) who show that it requires 14–20 times as much D-thyroxine to increase the oxygen consumption of rats by 50% than to lower the serum cholesterol by 50%. However, in the case of tetraiodothyroacetic acid, a metabolite of D-thyroxine, the ratio is only 2–5. Further, in the case of triiodoacetic acid, the metabolite formed by deamination and deiodination, the ratio is 6–10.

In short, the prior art compounds are all deficient in their failure to eliminate or at least minimize the undesirable side reactions and effects noted above or to provide a favorable and advantageous balance between the desired hypolipemic effect and side effects.

Development of a compound or class of compounds which overcomes these deficiencies is, therefore, highly desirable in view of the high incidence of atherosclerosis. This desideratum has now been accomplished by the invention of a series of novel compounds of the formula

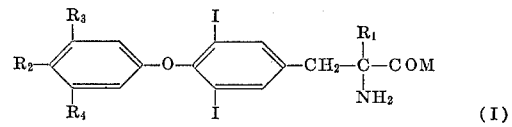

wherein $R_1$ is selected from the group consisting of (lower)alkyl which may be straight chained or branched and cycloalkyl having from 3 to 6 carbon atoms; $R_2$ is selected from the group consisting of hydroxy, halogen, cycloalkoxy containing from 3 to 6 carbon atoms, and (lower)alkoxy; each of $R_3$ and $R_4$ is individually selected from the group consisting of hydrogen, halogen and (lower)alkyl; M is selected from the group consisting of hydroxy, (lower) alkoxy, phenoxy, halogen substituted phenoxy, (lower)alkyl substituted phenoxy, piperidyl and $NR_5R_6$ wherein each of $R_5$ and $R_6$ is individually selected from the group consisting of hydrogen, (lower)alkyl and hydroxy (lower)alkyl. By (lower)alkyl and (lower) alkoxy are meant those alkyl and alkoxy groups containing up to 4 carbon atoms. By halogen is meant bromo, chloro, fluoro and iodo.

The principal novel feature of this invention which resides in the above series of compounds is their resistance to metabolic deamination. The presence of the α-alkyl substituent leads, quite unexpectedly, to products of greater metabolic stability with a resultant enhanced half-life and prolongation of the beneficial hypolipemic effects of such agents. Modifications of the substituent groups in the phenoxyphenyl moiety of these compounds, as noted above for thyroxine and thyronine, also effect variations in hypolipemic activity to a greater or lesser degree. However, the major and surprising change in properties observed is directly attributable to the α-alkyl substituent.

These compounds, therefore, possibly as a consequence of their improved metabolic stability possess more favorable ratios of hypolipemic-calorigenic response, and of hypolipemic-antigoitrogenic response than do the analogous non-α-substituted compounds.

A preferred class of compounds within the ambit of the above generic formula are the α-(lower)alkyl triiodothyronines, the compounds wherein $R_1$ is (lower)alkyl, $R_2$ is hydroxy, and one of $R_3$ and $R_4$ is iodo. Of particular interest is α-methyl-3,3',5-triiodothyronine, especially the D-isomer thereof, since it not only embodies the favorable and desirable properties mentioned above to a marked degree but, relatively speaking, is more easily prepared than are the higher homologs or the remaining congeners within the generic formula.

The over-all effect on the physiological behavior of thyronine and thyroxine and derivatives thereof resulting from introduction of the α-(lower)alkyl or cycloalkyl group ($R_1$) cannot be predicted from the prior art. The presence of the substituent causes, in general, a decrease in the value of all parameters (hypocholesteremic, calorigenic and antigoitrogenic activities) measured. Hypocholesteremic activity is generally lowered to a lesser degree than are other thyromimetic properties which are greatly depressed. For example, the calorigenic activity is markedly reduced; to such an extent, in fact, that the ratio of hypolipemic-calorigenic response becomes very favorable. Further, DL-α-methylthyroxine appears to be less than 1/200 as active as DL-thyroxine in the standard antigoitrogenic assay. It is completely devoid of such activity at hypolipemic doses. Maintenance of hypocholesteremic activity with depression of other undesirable thyromimetic properties is obtained.

In a comparative study of the physiological effects of thyroxine and 3,3′,5-triiodo-L-thyronine with a number of α-(methyl substituted)polyiodothyronines of this invention, the α-methyl substituted compounds exhibited decreased potency in all parameters measured as noted above. The compounds are administered subcutaneously daily in 1 ml. of saline adjusted to pH 9.8 with sodium hydroxide at various dose levels. In each assay described below, the test compound is administered at a number of dose levels and regression lines and relative potencies calculated according to the methods outlined by Finney, "Statistical Method in Biological Assay," Charles Griffin & Co. Ltd., London (1952).

The hypocholesteremic assay

Groups of ten thyroidectomized female rats weighing 100–130 g. are placed 7–10 days post-operatively on a diet containing 1% cholesterol and 10% olive oil in Purina ground rat food for a period of 7 days. The plasma cholesterol levels of these animals are determined by development of a Lieberman-Burchard color as outlined by Carr and Drekter (Clin. Chem. 2, 353, 1956). From previous experience it is known that a normal rat subjected to this diet for one week will attain a plasma cholesterol level of approximately 110 mg.%.

The compounds are evaluated for their ability to prevent the occurrence of plasma cholesterol values in excess of 110 mg.% seen when thyroidectomized animals were placed on the special diet. Untreated thyroidectomized animals receiving the diet were included in each experiment as controls. The percent inhibition of rise of plasma cholesterol was calculated using the following formula:

$$\frac{\text{control value—treated value}}{\text{control value—110}} \times \frac{100}{1} = \% \text{ inhibition of rise}$$

The anti-goitrogenic assay

Groups of ten normal female rats are maintained on normal ground food containing 0.5% thiouracil for 7 days. At the end of this period the animals are sacrificed by means of ether, the thyroid removed and weighed and the weight expressed as mg./100 g. rat. Each experiment included two types of controls (1) normal rats on thiouracil diet and (2) normal rats on normal food. The difference between the thyroid weights of the two control groups are considered the standard goiter. The difference between the thyroid weights of the treated and untreated animals on the thiouracil diet is considered the experimental goiter. The ratio of the experimental to the standard goiter multiplied by 100 converts the data to percent inhibition of goiter formation.

Assay of oxygen consumption, survival time and heart weight

Groups of ten thyroidectomized female rats weighing 100–130 g., 7–10 days post-operatively, are administered experimental compounds for 7 days while on a normal diet. Untreated controls are included in each experiment. On the eighth day individual animals are placed in 1 quart mason jars, the jars closed, and the oxygen concentration in the container determined at the end of 15 minutes using the Beckman Model 777 oxygen analyzer. The results are converted to ml. of oxygen consumed per square meter of body surface per hour and expressed as percent increase relative to the untreated thyroidectomized controls. The animals are allowed to asphyxiate in these same containers and the survival time, the time span from confinement to death, recorded. Using an inverse proportion the result is expressed as minutes/100 g. rat. This in turn is converted to percent depression of survival time. This parameter is of interest since it appears to be directly correlated with the calorigenic activity.

The hearts of these same animals are dissected, opened, rinsed in saline, blotted dry and weighed. The results are converted to mg./100 g. rat and then expressed as percent increase relative to the controls.

The various determinations are summarized in Tables I–IV.

TABLE I.—HYPOCHOLESTEREMIC ASSAY

| Compound: | Dose Schedule | | Relative Potency |
|---|---|---|---|
| | No. of Levels | Range (mcg./kg.) | |
| DT$_3$ | | | [1] 150 |
| LT$_3$ | 6 | 0.3–10 | 214 |
| LT$_4$ | 8 | 1–10 | 100 |
| DT$_4$ | 6 | 7–60 | 17 |
| DLMT$_4$ | 8 | 500–10,000 | 0.22 |
| DLMT$_3$ | 7 | 3–200 | 12 |
| DMT$_3$ | 5 | 30–3,000 | 2.2 |
| LMT$_3$ | 4 | 10–300 | 16 |

[1] See footnote at bottom of Table III.

TABLE II.—ANTIGOITROGENIC ASSAY

| Compound: | Dose Schedule | | Relative Potency |
|---|---|---|---|
| | No. of Levels | Range (mcg./kg.) | |
| DT$_3$ | | | [1] 60 |
| LT$_3$ | | 0.3–10 | 617 |
| LT$_4$ | 3 | 3–30 | 100 |
| DT$_4$ | 3 | 10–100 | 19 |
| DLMT$_3$ | 3 | 50–200 | 8.6 |
| DMT$_3$ | 3 | 300–3,000 | 0.85 |
| LMT$_3$ | 3 | 10–100 | 36 |

[1] See footnote at bottom of Table III.

TABLE III.—OXYGEN CONSUMPTION, SURVIVAL TIME DEPRESSION, HEART WEIGHT ASSAY

| Compound | Dose Schedule | | Relative Potency | | |
|---|---|---|---|---|---|
| | No. of Levels | Range (mcg./kg.) | Oxygen Consumption | Survival Time Depression | Heart Weight |
| DT$_3$ | | | | [1] 30 | |
| LT$_3$ | 5 | 1–1,000 | 569 | 799 | 989 |
| LT$_4$ | 4 | 1–10,000 | 100 | 100 | 100 |
| DT$_4$ | 5 | 10–30,000 | 2.7 | 6.1 | 3.6 |
| DLMT$_3$ | 5 | 30–10,000 | 2.5 | 10 | 5.6 |
| DMT$_3$ | 4 | 3,000–300,000 | 0.044 | 0.17 | 0.66 |
| LMT$_3$ | 5 | 10–3,000 | 38 | 37 | 45 |

[1] Boyd et al., loc. cit.

The surprising advantages of the compounds of this invention over those of the prior art are brought out by the calculation of various therapeutic indices using hypocholesteremic activity as the therapeutic effect and the various parameters (antigoitrogenic activity, heart weight, oxygen consumption and survival time) as the undesirable effect (Table IV).

TABLE IV.—THERAPEUTIC INDICES $\dfrac{\text{Relative hypocholesteremic potency}}{\text{Relative potency of parameter}} = \text{therapeutic index}$

| Compound | Antigoitrogenic | Heart Weight | Survival Time | Oxygen Consumption |
|---|---|---|---|---|
| LT₄ | 1 | 1 | 1 | 1 |
| LT₃ | 0.4 | 0.2 | 0.3 | 0.4 |
| DT₄ | 0.9 | 4.9 | 2.9 | 6.5 |
| DLMT₃ | 1.4 | 2.2 | 1.2 | 4.9 |
| DMT₃ | 2.7 | 3.4 | 13 | 51 |
| LMT₃ | 0.5 | 0.4 | 0.4 | 0.4 |

The compounds with the more desirable profiles of activity are D-α-methyltriiodothyronine (DMT₃) and D-thyroxine (DT₄).

The hypocholesteremic activity of these novel compounds is also demonstrated in dogs. D-α-methyltriiodothyronine, for example, when administered intravenously to four male mongrel dogs at a dose of 5 mg./kg. daily for eleven days produced a maximal reduction in plasma cholesterol concentration of 34% of the control value. Analogous experiments with L-thyroxine at 0.01 mg./kg. and 0.1 mg./kg. produced maximal falls of 13% and 37%, respectively.

The methyl ester of D-α-methyltriiodothyronine when administered orally at levels of 1 and 20 mg./kg. daily for one week to rats maintained on a 0.5% thiouracil diet produced 26% and 43% blocks of the thiouracil induced goiters.

When administered by the oral route to animals the novel products of this invention are given in dosages of from about 1 to about 50 mg./kg. per day. When administered intravenously, e.g. subcutaneously, a dosage of from about 0.5 to about 5 mg./kg. per day is given.

Also included within this invention are the non-toxic, pharmaceutically-acceptable salts of the acids represented by the above general formula (M=OH), such as the alkali metal, alkaline earth metal, ammonium and substituted ammonium salts such as those derived from diethylamine, pyridine, mono- and di-ethanolamine, N,N'-dibenzylethylenediamine and other organic bases commonly employed to form salts with such acids; and the mineral acid salts.

Of particular value are the sodium and potassium salts by reason of their solubility in water relative to that of the acids. The esters and amides are especially valuable by reason of their greater absorption by the animal body relative to that of the corresponding free acid or salt forms of these compounds. Additionally, the esters and amides represent convenient forms for use in various water-water miscible organic solvent formulations and non-aqueous liquid compositions. Further, the O-(lower) acyl derivatives of those compounds wherein R₂ is hydroxy are, from a pharmacological standpoint, considered to be equivalent to the non-acylated products to which they revert in vivo.

Included also within the purview of this invention are the DL, the D- and the L-forms of these novel compounds. The DL-forms, as noted below, are most easily obtained by virtue of the synthesis used. However, the D- and the L-isomers, each of which possesses measurable and significant hypolipemic activity, are separable by known methods using, for example, optically active organic bases. In general, the D-isomer is characterized by a greater preferential effect on cholesterol metabolism than is the L-isomer.

The separation of activities between the D- and L-isomers of α-methyl-3,3′,5-triiodothyronine is quite remarkable. Table V records the ratio of activities of enantiomorphic pairs of thyronines. It demonstrates that the hypercholesteremic activity of the four compounds with the alanine side chain is much less susceptible to changes in configuration at the α-carbon than are the other parameters. This effect is greatly magnified in the α-methyl series.

TABLE V

| Compound | Activity | | |
|---|---|---|---|
| | Hypocholesteremic | Calorigenic | Antigoitrogenic |
| LT₄/DT₄ | 5 | 45 | 7 |
| LT₃/DT₃ | 2 | 30 | 23 |
| LT₂/DT₂ | 3 | 15 | 12 |
| L₃′Prᵝট₂/D₃′Prᵝট₂ | 9 | 28 | 21 |
| Average | 5 | 25 | 14 |
| LMT₃/DMT₃ | 8 | 285 | 250 |

NOTE.—T₄=thyroxine; L and D=L and D enantiomorphs; T₃=3,3′,5-triiodothyronine; T₂=3,5-diiodothyronine; 3′Prᵝট₂=3′-isopropyl-3,5-diiodothyronine; MT₃=α-methyl-3,3′,5-triiodothyronine.

Analogs of the above compounds wherein the iodo groups at the 3,5-positions are replaced by chloro or bromo groups and/or the 3′,5′-positions substituted with trifluoromethyl or fluoro groups also exhibit hypolipemic activity and stability to deamination. Such compounds are generally of somewhat lesser hypolipemic activity than the corresponding iodo compounds, but of substantially the same stability as regards metabolic deamination.

The novel compounds of this invention are prepared by known methods beginning with the appropriately substituted benzyl(lower)alkyl ketone. These ketones can be prepared in any of several ways, for example, from the proper phenylacetonitrile, e.g. 4-methoxyphenylacetonitrile. Condensation of said acetonitrile derivative with an alkanoic acid ester, desirably a methyl or ethyl ester of a lower alkanoic acid such as ethyl acetate, methyl propionate, ethyl butyrate, ethyl valerate and methyl isobutyrate according to well known procedures forms the corresponding α-cyano-(4-methoxybenzyl)-(lower) alkyl ketone. The cyano group is then transformed by known methods to the (4-methoxybenzyl)lower alkyl ketone, e.g. by acid hydrolysis.

Alternatively, the (lower)alkyl ketone reactants are prepared by the method of Hoover et al., J. Org. Chem., 12, 501 (1947) from a substituted benzaldehyde, such as 4-hydroxybenzaldehyde and 4-methoxybenzaldehyde, via an aldol type condensation with a nitroalkane followed by reduction of the resulting nitro olefin. Still another method involves oxidation of the appropriately substituted propenylbenzene, e.g. anethole, by means of lead oxide (J. Org. Chem., 16, 1014, 1951).

The substituted benzylcycloalkyl ketones are prepared from the appropriate reactants substantially by the procedure described by Bruylants in Bull. Soc. chim. Belg. 36, 525 for benzylcyclopropyl ketone. This procedure comprises the reaction of cyanocyclopropane with benzylmagnesium chloride in ether followed by hydrolysis of the ketimine salt with 20% hydrochloric acid. Replacement of benzylmagnesium chloride by the appropriately substituted benzylmagnesium chloride produces the desired cyclopropyl ketone compound. Similarly, from cyanocyclobutane, cyanocyclopentane and cyanocyclohexane the corresponding cycloalkyl ketones are obtained.

The (4-methoxybenzyl)(lower)alkyl or cycloalkyl ketone is converted to the corresponding 4-hydroxy compound via treatment with pyridinium chloride or hydrogen iodide and thence to DL-5-(4-hydroxybenzyl)-5 methyl hydantoin by reaction with ammonium carbonate and potassium cyanide. Alternatively, the ether group can be retained with formation of the ether corresponding to the hydantoin and then removed to give the aforementioned (hydroxybenzyl) hydantoin compound. Nitration of the thus produced hydantoin gives the 3,5-dinitro derivative which is then treated with toluene-p-sulfonyl chloride and pyridine followed by 4-methoxyphenol to form the 4-methoxyphenyl ether of DL-5-(3,5-dinitro-4-hydroxybenzyl)5-methyl hydantoin as described by Potts, J. Chem. Soc., 1632 (1955). The dinitrohydantoin is then reduced, preferably catalytically over palladium, and then converted to the diiodo hydantoin via the tetrazonium salts. The thus produced DL - 5 - [3,5 - diiodo-4-(4'-methoxyphenoxy)benzyl]-5-methyl hydantoin is next demethylated by means of hydriodic acid to DL-5-[3,5-diiodo-4-(4'-hydroxyphenoxy)-benzyl]-5-methyl hydantoin which is then cleaved to the corresponding amino acid by a suitable base, e.g., barium hydroxide, sodium hydroxide. Subsequent iodination with iodine/potassium iodide produces the tri- and tetra-iodo derivatives; e.g., DL-$\beta$-[3,5-diiodo-4 - (3' - iodo - 4' - hydroxyphenoxy)phenyl] - $\alpha$-methyl-$\alpha$-alanine ($\alpha$-methyl-3,3',5-triiodothyronine) and DL-$\beta$-[3,5-diiodo - 4 - (3',5' - diiodo - 4'-hydroxyphenoxy)phenyl]-$\alpha$-methyl-$\alpha$-methyl-$\alpha$-alanine ($\alpha$-methylthyroxine).

The above sequence produces, of course, the DL-product which can, as previously mentioned, be resolved by known methods. A convenient method comprises conversion of the DL-product to an N-acyl derivative, e.g., N-formyl, N-acetyl, etc. and resolution of the DL- N-acyl derivative by means of D- or L-$\alpha$-phenethylamine as described below. Other N-acyl derivatives such as N-propionyl, N-butyryl can be used but appear to offer no advantages over their lower homologs. In lieu of preparing the DL-product and resolving the finished product, any one of the intermediates in the over-all sequence which possesses the asymmetric center can be resolved by appropriate methods.

In still another sequence, DL-$\alpha$-methyl tyrosine is converted to its N-aceto derivative by means of acetic anhydride which is then resolved into its D- and L- forms by, for example, use of brucine, $\alpha$-phenethylamine, amphetamine or strychnine according to known methods. The isomers are then nitrated to the respective 3,5-dinitro compounds, esterified, e.g. ethyl ester, then etherified by reaction with the appropriately substituted phenol, such as p-methoxyphenol, to give the N-acetyl-$\alpha$-methyl-3,5-dinitro-4-(4'-methoxyphenoxy) tyrosine ethyl ester. The dinitro phenoxy derivative is then catalytically reduced (Pd/C) and then transformed to the diiodo derivative via the tetrazonium salt. Demethylation by suitable means, e.g. hydriodic acid, gives the desired $\beta$-[3,5-diiodo-4-(4'-hydroxyphenoxy)phenyl]-$\alpha$-methyl $\alpha$-alanine ($\alpha$-methyl-3,5-diiodo thyronine). Iodination, as above, gives the tri- and/or tetra-iodo derivatives.

The esters and amides described herein are prepared by methods well known in the art. Esterification, for example, is accomplished by reacting the desired acid of Formula I with the appropriate alcohol in the presence of an acid catalyst, e.g. thionyl chloride, sulfuric acid, hydrogen chloride or toluene sulfonic acid. The amides can be conveniently obtained by reaction of the acid chlorides with ammonia or an amine according to known procedures.

As will be appreciated by those skilled in the art, various modifications in materials and methods can be adopted without departure from the invention as is exemplified in part herein. The following examples are illustrative of the preparation of compounds of this invention and are not intended as a limitation of the invention.

EXAMPLE I.—4-METHOXYBENZYL (LOWER)ALKYL KETONES

A 4-methoxybenzyl methyl ketone

Following the procedure of Hoover et al., J. Org. Chem. 12, 501 (1947), a mixture of 4-methoxybenzaldehyde (27.2 g.), nitroethane (15.0 g.) and n-butylamine (4.0 ml.) in 35 ml. of absolute ethanol are heated to reflux for 6 hours. The mixture is cooled, filtered, concentrated and cooled again to give the intermediate 1-(4-methoxyphenyl)-2-nitropropene.

To a rapidly stirred mixture of the nitro olefin (96.5 g.) iron filings (200 g., 40 mesh), 500 ml. water and 1 g. of ferric chloride under reflux for 8 hours, concentrated hydrochloric acid (90 ml.) is added dropwise throughout this period. Steam distillation of the mixture followed by ether extraction of the distillate and subsequent distillation provides the product.

Repetition of this procedure but using the appropriate nitroalkane in place of nitroethane produces the following 4-methoxybenzyl (lower)alkyl ketones:

4-methoxybenzyl ethyl ketone
4-methoxybenzyl propyl ketone
4-methoxybenzyl isopropyl ketone
4-methoxybenzyl butyl ketone
4-methoxybenzyl isobutyl ketone Replacement of 4-methoxybenzaldehyde by the appropriate 4-(substituted) benzaldehyde produces the analogous compounds wherein the 4-substituent is ethoxy, propoxy, isopropoxy, butoxy, cyclohexoxy, cyclopentoxy, cyclobutoxy, cyclopropoxy.

B

To 740 g. of anethole and 270 ml. of glacial acetic acid at 60° C. there is added 3122 g. of red lead oxide portionwise over a period of 6 hours with efficient stirring. At the end of this period an additional 270 ml. of glacial acetic acid is added, taking care to keep the temperature below 70° C. The mixture is stirred for 2 hours. Glacial acetic acid (950 ml.) is added with cooling to keep the temperature below 75° C. One liter of water and 1 liter of chloroform are then added and the mixture allowed to stand overnight at a temperature of about 30° C. The whole reaction mass is then transferred to a 12 liter flask which is then filled to the top with water. The mixture is stirred and heated to 50–60° C., filtered through a Buchner funnel having an acid-washed SuperCel pad. The filter cake is washed with 1 liter chloroform, reslurried in 2 liters chloroform, and refiltered.

The chloroform layer is then separated and the aqueous layer extracted 3 times with 2 liters of chloroform (if necessary, water is added to the filtrate to obtain a specific gravity of the aqueous solution light enough to effect separation of the chloroform layer). The combined chloroform extracts are washed twice with 2 liters of water, once with 2 liters of 5% sodium bicarbonate solution, and once with 2 liters of water. The chloroform solution is then dried over anhydrous sodium sulfate, filtered, and the solvent stripped off. The oily residue (1180 g.) is distilled in vacuo at 0.7 mm., B.P. 94–105° C. The yield is 411.7 g. of 4-methoxybenzyl methyl ketone.

C 4-methoxybenzyl (lower)alkyl ketones

To a hot solution of sodium ethoxide (prepared from 6 g. sodium and 60 ml. absolute ethanol) there is added a solution of 4-methoxyphenylacetonitrile (36 g.) in dry ethylacetate (50 g.). The mixture is refluxed for 4 hours and, after standing overnight at room temperature, is cooled in an ice bath and filtered. The solid is washed with ethylacetate followed by ether.

The thus obtained salt is dissolved in 325 ml. water, cooled to about 10° C. and acidified with glacial acetic acid (85 ml.). The product, $\alpha$-(4-methoxyphenyl)-acetoacetonitrile is filtered, washed with water and dried. For purification it is recrystallized from methanol.

The crude acetoacetonitrile product is added during 1 hour to a solution of 175 ml. concentrated sulfuric acid in 45 ml. water at 0°–5° C. The solution is then heated to 75°–80° C. for 10 minutes, cooled and diluted with 650 ml. water. The mixture is heated on a steam-bath for 3 hours, cooled and extracted with ether. The ether extract is washed with dilute aqueous sodium bicarbonate, dried and concentrated and the concentrate distilled in vacuo to give the product.

The following ketones are prepared in like manner from the appropriate alkanoic acid ethyl ester.

4-methoxybenzyl ethyl ketone
4-methoxybenzyl propyl ketone
4-methoxybenzyl butyl ketone

EXAMPLE II.—4-METHOXYBENZYL CYCLOALKYL KETONES

An ethereal solution of cyanocylopropane (16.8 g., 0.25 mole) diluted with 100 ml. dry ether is added to an ethereal solution of p-methoxybenzylmagnesium chloride (prepared from 25 g. of magnesium and 146.5 g. of p-methoxybenzyl chloride, in 500 ml. dry ether), the solution being stirred during the addition. After standing overnight the solution is poured on 500 g. of ice and 300 ml. of concentrated hydrochloric acid. The aqueous layer is separated and refluxed vigorously for 1 hour. It is then cooled and extracted with ether. The ketone is then obtained by fractional distillation.

Similarly, the following 4-methoxybenzyl cycloalkyl ketones are prepared:

4-methoxybenzyl cyclobutyl ketone
4-methoxybenzyl cyclopentyl ketone
4-methoxybenzyl cyclohexyl ketone

EXAMPLE III.—4-HYDROXYBENZYL (LOWER)ALKYL KETONES

The 4-methoxybenzyl (lower)alkyl and cycloalkyl ketones of Examples I and II are demethylated by refluxing for 1 hour with 57% hydriodic acid and glacial acetic acid in the proportion of 10 ml. hydriodic acid and 10 ml. glacial acetic acid per 3.3 g. of methoxy compound. The products are recovered by extraction with ether and distillation in vacuo.

EXAMPLE IV.—DL-5-(4-METHOXYBENZYL)-5-METHYLHYDANTOIN

Following essentially the procedure of Potts, J. Chem. Soc. 1632 (1955), potassium cyanide (450 g.); ammonium carbonate (1500 g.) and 4-methoxybenzyl methyl ketone (840 g.) in 7500 ml. of 50% ethanol are heated together at 55° C. for 6 hours. The mixture is cooled, diluted with 4 liters of 25% ethanol and filtered. The filter cake is washed with water and air-dried at 55° C.; M.P. 196–197° C. The product is recrystallized from water-ethanol (20:3).

The remaining ketones of Examples I–III are converted to their corresponding hydantoins in like manner.

EXAMPLE V.—DL-5-(4-HYDROXYBENZYL)-5-METHYLHYDANTOIN

The title methyl ether of Example IV (790 g.) is demethylated by refluxing under nitrogen with hydriodic acid (2 liters, 57%) and glacial acetic acid (2 liters) for 30 minutes. The desired product separates during reflux. The mixture is cooled, diluted with 7 liters of water, cooled and filtered. The filter cake is washed with cold water followed by hot water, then air-dried; M.P. 307–305° C. (85.5% yield). The product is slurried in refluxing ethanol-water (1:1), cooled, filtered, washed with ethanol and air-dried; M.P. 309–310° C.

The remaining DL-5-(4-methoxybenzyl)-5-(lower)alkyl and cycloalkyl hydantoins of Example IV are similarly demethylated to their respective 5-(4-hydroxybenzyl)-5-(lower)alkyl hydantoins.

EXAMPLE VI.—DL-5-(3,5-DINITRO-4-HYDROXYBENZYL)-5-METHYLHYDANTOIN

To a stirred solution of concentrated nitric acid (1 liter of 70%) at room temperature there is added portionwise over a 50-minute period DL-5-(4-hydroxybenzyl)-5-methylhydantoin (285 g.). The mixture is stirred for 1 hour, poured onto cracked ice, the solid collected, washed with water and air-dried. It is purified by slurrying in 14 liters of refluxing ethanol-water (1:1) for 1 hour, filtering while hot and washing the filter cake with 2×2 liters of hot ethanol-water (1:1). It is then dried in air; M.P. 275–276° C. (dec.). A second crop is obtained on cooling the mother liquor. Total yield=67%.

The remaining hydroxybenzyl hydantoins of Example V and those of Example IV are similarly converted to their 3,5-dinitro derivatives. In this manner the following compounds are obtained.

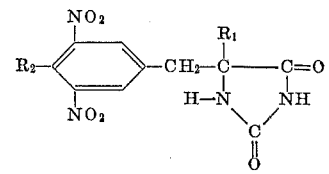

where $R_1$ is ethyl, propyl, isopropyl, butyl, isobutyl, cyclopropyl, cyclobutyl, cyclopentyl, and cyclohexyl, and $R_2$ is hydroxyl and methoxyl.

EXAMPLE VII.—DL-5-[3,5-DINITRO - 4 - (4' - METHOXYPHENOXY)BENZYL] - 5 - METHYLHYDANTOIN

A mixture of DL-5-[3,5-dinitro-4-hydroxybenzyl]-5-methylhydantoin (5 g.) toluene-p-sulfonylchloride (4.6 g.) and dry pyridine (40 ml.) is refluxed for 30 minutes. 4-methoxyphenol (6.8 g.) is then added and the mixture refluxed for an additional 2 hours. Removal of the pyridine under reduced pressure leaves an oil which is taken up in acetone and the acetone solution poured onto cracked ice. The solid which precipitates is recovered, crystallized from dilute acetone and then from methanol; M.P. 147° C. (Potts, J. Chem. Soc., 1632, 1955). Yield= 69.7%.

In like manner, the remaining dinitro hydroxybenzyl hydantoins of Example VI are converted to their 4-(substituted)phenoxy ethers using the proper 4-substituted phenol. The following are thus prepared.

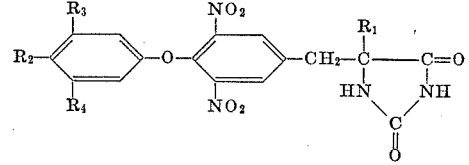

| $R_1$ | $R_2$ | $R_3$ | $R_4$ |
|---|---|---|---|
| $CH_3$ | $C_2H_5O$ | H | H |
| $C_2H_5$ | $CH_3O$ | Br | Br |
| n-$C_3H_7$ | $CH_3O$— | H | H |
| i-$C_3H_7$ | $CH_3O$— | H | H |
| n-$C_4H_9$ | $CH_3O$— | H | H |
| i-$C_4H_9$ | $CH_3O$— | H | H |
| $CH_3$ | $CH_3O$— | $CH_3$ | H |
| $CH_3$ | $C_2H_5O$— | $CH_3$ | $CH_3$ |
| $CH_3$ | $CH_3O$— | n-$C_4H_5$ | H |
| $CH_3$ | $CH_3O$— | n-$C_4H_9$ | n-$C_4H_9$ |
| $C_2H_5$ | $CH_3O$— | $C_2H_5$ | $C_2H_5$ |
| $CH_3$ | n-$C_4H_9O$— | H | H |
| $CH_3$ | n-$C_3H_7O$— | $CH_3$ | $CH_3$ |
| $C_2H_5$ | $C_2H_5O$— | H | H |
| $C_3H_7$ | i-$C_3H_7O$— | $CH_3$ | H |
| $CH_3$ | $CH_3O$— | H | H |
| $CH_3$ | $CH_3O$— | F | H |
| $C_2H_5$ | $CH_3O$— | F | F |
| $C_3H_5$ | $CH_3O$— | F | H |
| $CH_3$ | I | H | H |
| n-$C_4H_9$ | I | H | H |
| n-$C_4H_9$ | F | $CH_3$ | H |
| $C_2H_5$ | I | $C_2H_5$ | $C_2H_5$ |
| $CH_3$ | Cl | H | H |
| $CH_3$ | Cl | $CH_3$ | $CH_3$ |
| $C_2H_5$ | Br | $CH_3$ | H |
| $C_2H_5$ | Br | H | Br |
| $CH_3$ | $CH_3O$— | Cl | Cl |
| $CH_3$ | $CH_3O$— | $CH_3$ | $CH_3$ |
| t-$C_4H_9$ | $CH_3O$— | H | Br |
| $CH_3$ | $CH_3O$— | Cl | H |
| $CH_3$ | $C_6H_{11}O$— | H | H |
| $CH_3$ | $C_5H_9O$— | H | H |
| $CH_3$ | $C_3H_5O$— | H | H |
| $CH_3$ | $C_4H_7O$— | H | H |
| $C_2H_5$ | $C_6H_{11}O$— | $CH_3$ | Cl |
| $C_3H_7$ | $C_5H_9O$— | H | H |
| $C_3H_5$ | $CH_3O$— | Br | Br |

| $R_1$ | $R_2$ | $R_3$ | $R_4$ |
|---|---|---|---|
| $C_3H_5$ | $CH_3O-$ | $CH_3$ | H |
| $C_3H_5$ | $CH_3O-$ | $CH_3O-$ | H |
| $C_4H_7$ | $CH_3O-$ | H | H |
| $C_5H_9$ | $CH_3O-$ | H | H |
| $C_6H_{11}$ | $CH_3O-$ | H | H |
| $C_3H_5$ | I | H | H |
| $C_3H_5$ | $CH_3O-$ | F | H |

EXAMPLE VIII.—DL-5-[3,5-DIAMINO-4 - (4' - METHOXYPHENOXY)BENZYL] - 5 - METHYLHYDANTOIN

5-[3,5-dinitro-4-(4'-methoxyphenoxy)benzyl]-5-methylhydantoin (20.0 g.) is suspended in 150 ml. glacial acetic acid and reduced by hydrogen in the presence of 2 g. of 10% palladium-on-charcoal. The catalyst is filtered off, the solvent removed in vacuo and the residue twice recrystallized from ethanol-water to give 11.9 g. of the diamino compound; M.P. 203.5–206° C. Yield=69.5%. A sample recrystallized twice more from ethanol-water melts at 205–207° C. and gives the following analysis:

Analysis.—Calcd. for: $C_{18}H_{21}ClN_4O_4$: C, 55.03; H, 5.39; N, 14.26%. Found: C, 55.46; H, 5.48; N, 14.02%.

A mono-hydrochloride is prepared by the addition of a solution of hydrogen chloride in ethyl acetate to a solution of the diamine in the same solvent. It is purified by the addition of hot ethyl acetate (35 ml.) to a solution of the amine (4.8 g.) in hot methanol (35 ml.) and collecting the crystals obtained on cooling; M.P. 242–243° C.

Analysis.—Calcd. for: $C_{18}H_{21}ClN_4O_4$: C, 55.03; H, 5.39; N, 14.26%. Found: C, 55.46; H, 5.48; N, 14.02%.

The dinitro hydantoins in the table of Example VII are similarly reduced to the corresponding diamine compounds.

EXAMPLE IX.—DL-5-[3,5-DIIODO-4-(4'-METHOXYPHENOXY)BENZYL]-5-METHYLHYDANTOIN

DL-5-[3,5-diamino-4- (4'-methoxyphenoxy) benzyl]-5-methylhydantoin (10.3 g.) is tetrazotized in the following manner: 8.79 g. of sodium nitrite is added to a mixture of 140 ml. of glacial acetic acid and 140 ml. of concentrated sulfuric acid with mechanical stirring. The mixture is cooled to 0° C. and a solution of the diamino compound in 100 ml. of glacial acetic acid then added during about 45 minutes with mechanical stirring. The reaction mixture is stirred for a further hour at 0–5° C. then added slowly to a solution of sodium iodide (40.8 g.) and iodine (27.5 g.) in 450 ml. of water over a period of 1 hour. The temperature is not allowed to rise over 40° C. When addition is completed the dark brown reaction mixture is stirred for 15 minutes. Ethyl-acetate (750 ml.) is added, the layers separated and the aqueous layer extracted twice with two 200 ml. portions of ethylacetate. The combined ethyl-acetate evtracts are washed with 4×200 ml. of 10% sodium bisulfite solution followed by 4×150 ml. water and percolated through anhydrous sodium sulfate. The solvent is removed in vacuo and the residue recrystallized from acetic acid-water (2:1), with charcoaling, to give 11.7 g. (70% of theory) of colorless crystals; M.P. 262–264° C.

Analysis.—Calcd. for: $C_{18}H_{16}O_4N_2I_2$: C, 37.41; H. 2.79; N, 4.85%. Found: C, 37.53; H, 2.77; N, 4.48%.

EXAMPLE X.—DL - 5 - (4 - PHENOXYBENZYL)-3-(LOWER)ALKYL HYDANTOINS

The products of Example VIII are converted to their respective tetrazonium or diazonium salts by procedure of Example IX and thence to the corresponding iodo compounds.

Additionally, certain of the tetrazonium salts are chlorinated or brominated using potassium chloride or bromide and finely divided copper.

The following chloro and bromo compounds are thus prepared.

| $R_1$ | $R_2$ | 3- | 5- | $R_3$ | $R_4$ |
|---|---|---|---|---|---|
| $CH_3$ | $CH_3O-$ | Cl | Cl | H | H |
| $CH_3$ | $C_2H_5O-$ | Br | Br | H | H |
| $CH_3$ | $CH_3O-$ | Cl | Cl | Cl | H |
| $C_2H_5$ | $CH_3O-$ | Br | Br | Br | Br |
| $CH_3$ | $CH_3O$ | Cl | Cl | Cl | Cl |
| $C_2H_5$ | $CH_3O-$ | Cl | Cl | H | H |
| n-$C_3H_7$ | $CH_3O-$ | Cl | Cl | H | H |
| i-$C_4H_9$ | $CH_3O-$ | Br | Br | H | H |
| $C_2H_5$ | Br | Br | Br | H | Br |
| $CH_3$ | Cl | Cl | Cl | H | H |
| $CH_3$ | I | Cl | Cl | H | H |
| $CH_3$ | $CH_3O-$ | Cl | Cl | $CH_3$ | $CH_3$ |
| $CH_3$ | $CH_3O-$ | Cl | Cl | $CH_3$ | H |
| $CH_3$ | $CH_3O-$ | Cl | Cl | n-$C_4H_9$ | n-$C_4H_9$ |
| n-$C_4H_9$ | F | Cl | Cl | $CH_3$ | H |
| $C_2H_5$ | Br | Br | Br | $CH_3$ | H |
| $C_2H_5$ | $C_6H_{11}O-$ | Cl | Cl | $CH_3$ | Cl |
| $CH_3$ | $C_3H_9O-$ | Cl | Cl | H | H |
| $CH_3$ | $C_4H_7O-$ | Br | Br | H | H |
| $CH_3$ | $CH_3O-$ | Cl | Cl | F | H |
| $C_3H_5$ | $CH_3O-$ | Br | Br | Br | Br |
| $C_4H_7$ | $CH_3O-$ | Cl | Cl | H | H |
| $C_3H_5$ | $CH_3O-$ | Cl | Cl | $CH_3$ | H |
| $C_6H_{11}$ | $CH_3O-$ | Cl | Cl | H | H |

EXAMPLE XI.—DL-5-[3,5-DIIODO-4-(4'-HYDROXYPHENOXY)BENZYL]-5-METHYLHYDANTOIN

DL-5-[3,5-diiodo-4-(4' - methoxyphenoxy)benzyl] - 5-methylhydantoin (3.7 g.) is heated under reflux for one hour in a mixture of 57% hydriodic acid (10 ml.) and glacial acetic acid (10 ml.). A precipitate begins to form after 20 minutes of heating. At the end of 1 hour the reaction mixture is cooled and the precipitate filtered and washed thoroughly with water to give 3.30 g. of white solid; M.P. 288.5–293.5° C. Analysis of a sample recrystallized from ethanol-water (1:1), M.P. 294–297° C., gives:

Analysis.—Calcd. for $C_{17}H_{14}O_4N_2I_2$: C, 36.19; H, 2.50; N, 4.97%. Found: C, 36.39; H, 2.63; N, 4.40%.

The remaining products of Examples IX and X are cleaved in like manner to the respective 5-[4-(4'-hydroxyphenoxy)benzyl]-5-(lower)alkyl hydantoins and 5-[4-(4'-hydroxyphenoxy)benzyl]-5-cycloalkyl hydantoins.

EXAMPLE XII.—DL - β-[3,5-DIIODO-4-(4'-HYDROXYPHENOXY)PHENYL] - α - METHYLALANINE (DL-α-METHYL-3,5-DIIODOTHYRONINE)

A.

5 - [3,5 - diiodo - 4 - (4' - hydroxyphenoxy)benzyl] - 5-methylhydantoin (5.40 g.) is heated under reflux for 18 hours in 10% sodium hydroxide solution (110 ml.). The reaction mixture is then cooled, acidified with glacial acetic acid and after 3 hours stirring the precipitate is filtered off. The precipitate is taken up in 70 ml. of ethanol containing 6 ml. of concentrated hydrochloric acid and heated to boiling. Some insoluble material is filtered off and the hot filtrate treated with charcoal, filtered and diluted with 70 ml. of boiling water. The resulting solution is heated to boiling and treated with a saturated solution of sodium acetate until alkaline to Congo red. The crystals which form on cooling are filtered off; M.P. 267–269° C.

Analysis.—Calcd. for $C_{16}H_{15}O_4NI_2$: C, 35.64; H, 2.80; N, 2.60%. Found: C, 35.23; H, 2.98; N, 2.05%.

Repetition of this procedure using 94.0 g. of the starting hydantoin and proportionately increased quantities of other materials gives 73% yield (71.8 g.) of product.

The sodium salt is prepared by the addition of the acid (60 mg.) to boiling 10% sodium carbonate solution (1 ml.) and the crystals collected after cooling. The sodium salt darkens at around 260° C. and does not melt below 325° C.

Analysis.—Calcd. for $C_{16}H_{14}I_2NO_4Na \cdot H_2O$: C, 33.19; H, 2.78; N, 2.42%. Found: C, 33.15; H, 2.82; N, 2.25%.

After further drying the following analysis is obtained.

Analysis.—Calcd. for $C_{16}H_{14}I_2NO_4Na$: C, 34.25; H, 2.52; N, 2.50%. Found: C, 33.85; H, 2.58; N, 2.92%.

B.

The diiodohydantoin reactant of method A above (840 mg.), barium hydroxide (1.6 gm. of the octahydrate) and 50 ml. water are mixed together and refluxed for 64 hours. The mixture is then cooled and acidified with glacial acetic acid. The solid originally present dissolves and the white precipitate which forms is removed by filtration and washed twice with water. The solid is taken up in ethanol (17 ml.) containing 1 ml. concentrated hydrochloric acid, heated to boiling, treated with charcoal and filtered. The filtrate is diluted with 17 ml. water and a boiling saturated aqueous solution of sodium acetate added until the solution is alkaline to Congo red. The crystals which separate on cooling are filtered and dried; M.P. 265.5–268° C. (dec.).

Analysis.—Calcd. for $C_{16}H_{15}O_4NI_2$: C, 35,64; H, 2.80; N, 2.60%. Found: C, 35.03; H, 2.99; H, 2.56%.

EXAMPLE XIII

Following the procedures of Example XII–A and B, the remaining hydantoins of Example XI and those of Examples IX and X are converted to their respective α-alanine derivatives. The following compounds are thus obtained.

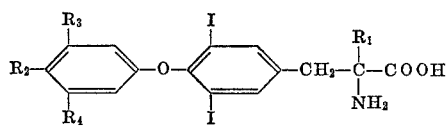

| $R_1$ | $R_2$ | $R_3$ | $R_4$ | Method |
|---|---|---|---|---|
| $CH_3$ | $C_2H_5O-$ | H | H | A |
| $C_2H_5$ | $CH_3O-$ | Br | Br | A |
| $n-C_3H_7$ | $CH_3O-$ | H | H | A |
| $i-C_3H_7$ | $CH_3O-$ | H | H | A |
| $n-C_4H_9$ | $CH_3O-$ | H | H | A |
| $i-C_4H_9$ | $CH_3O-$ | H | H | A |
| $CH_3$ | $n-C_4H_9O-$ | H | H | B |
| $CH_3$ | I | H | H | B |
| $n-C_4H_9$ | I | H | H | B |
| $CH_3$ | Cl | H | H | B |
| $C_2H_5$ | Br | H | Br | B |
| $C_2H_5$ | $C_2H_5O-$ | H | H | B |
| $CH_3$ | $CH_3O-$ | H | H | B |
| $CH_3$ | $CH_3O-$ | $CH_3$ | H | A |
| $CH_3$ | $C_2H_5O-$ | $CH_3$ | $CH_3$ | A |
| $CH_3$ | $CH_3O-$ | $n-C_4H_9$ | $n-C_4H_9$ | A |
| $C_2H_5$ | $CH_3O-$ | $C_2H_5$ | $C_2H_5$ | B |
| $CH_3$ | $n-C_3H_7O-$ | $CH_3$ | $CH_3$ | B |
| $C_3H_7$ | $i-C_3H_7O-$ | $CH_3$ | H | B |
| $n-C_4H_9$ | F | $CH_3$ | H | B |
| $C_2H_5$ | I | $C_2H_5$ | $C_2H_5$ | B |
| $CH_3$ | Cl | H | H | A |
| $CH_3$ | Cl | $CH_3$ | $CH_3$ | A |
| $C_2H_5$ | Br | $CH_3$ | H | B |
| $CH_3$ | $CH_3O-$ | $n-C_4H_9$ | H | A |
| $CH_3$ | $C_6H_{11}O-$ | H | H | A |
| $CH_3$ | $C_5H_9O-$ | H | H | A |
| $CH_3$ | $C_3H_5O-$ | H | H | A |
| $CH_3$ | $C_4H_7O-$ | H | H | A |
| $C_3H_5$ | $CH_3O-$ | F | H | A |
| $C_2H_5$ | $C_6H_{11}O-$ | $CH_3$ | Cl | A |
| $C_3H_7$ | $C_5H_9O-$ | H | H | A |
| $C_3H_5$ | $CH_3O-$ | $CH_3$ | H | A |
| $CH_3$ | $CH_3O-$ | $CH_3$ | $CH_3$ | A |
| $t-C_4H_9$ | $CH_3O-$ | H | Br | A |
| $CH_3$ | $CH_3O-$ | F | H | A |
| $C_2H_5$ | $CH_3O-$ | F | F | A |
| $CH_3$ | $CH_3O-$ | Cl | Cl | A |
| $CH_3$ | $CH_3O-$ | Cl | H | A |
| $C_3H_5$ | $CH_3O-$ | Br | Br | A |
| $C_4H_7$ | $CH_3O-$ | H | H | A |
| $C_5H_9$ | $CH_3O-$ | H | H | A |
| $C_6H_{11}$ | $CH_3O-$ | H | H | A |
| $C_3H_5$ | I | H | H | A |

| $R_1$ | $R_2$ | $R_3$ | $R_4$ | 3- | 5- | Method |
|---|---|---|---|---|---|---|
| $C_2H_5$ | $CH_3O-$ | Br | Br | Br | Br | A |
| $CH_3$ | $CH_3O-$ | Cl | Cl | Cl | Cl | A |
| $CH_3$ | $CH_3O-$ | Cl | H | Cl | Cl | A |
| $CH_3$ | $CH_3O-$ | H | H | Cl | Cl | A |
| $CH_3$ | $C_2H_5O-$ | H | H | Br | Br | A |
| $C_2H_5$ | $CH_3O-$ | H | H | Cl | Cl | A |
| $n-C_3H_7$ | $CH_3O-$ | H | H | Cl | Cl | A |
| $i-C_4H_9$ | $CH_3O-$ | H | H | Br | Br | A |
| $C_2H_5$ | Br | H | Br | Br | Br | A |
| $CH_3$ | Cl | H | H | Cl | Cl | A |
| $CH_3$ | I | H | H | Cl | Cl | A |
| $CH_3$ | $CH_3O-$ | $CH_3$ | $CH_3$ | Cl | Cl | A |
| $CH_3$ | $CH_3O-$ | $CH_3$ | H | Cl | Cl | A |
| $CH_3$ | $CH_3O-$ | $n-C_4H_9$ | $n-C_4H_9$ | Cl | Cl | A |
| $n-C_4H_9$ | F | $CH_3$ | H | Cl | Cl | A |
| $C_2H_5$ | Br | $CH_3$ | H | Br | Br | A |
| $C_2H_5$ | $C_6H_{11}O$ | $CH_3$ | Cl | Cl | Cl | A |
| $CH_3$ | $C_5H_9O$ | H | H | Cl | Cl | A |
| $CH_3$ | $C_4H_7O$ | H | H | Br | Br | B |
| $C_3H_5$ | $CH_3O-$ | Br | Br | Br | Br | B |
| $C_4H_7$ | $CH_3O-$ | H | H | Cl | Cl | B |
| $C_3H_5$ | $CH_3O-$ | $CH_3$ | H | Cl | Cl | A |
| $C_6H_{11}$ | $CH_3O-$ | H | H | Cl | Cl | A | and the corresponding products of Example XI wherein the (lower)alkoxyl groups ($R_2$) are replaced by OH. These are not tabulated for the sake of convenience but may be illustrated by compounds such as α-ethyl thyroxine where $R_1$ is ethyl, $R_2$ is hydroxy and $R_3$ and $R_4$ are hydrogen.

EXAMPLE XIV.—DL - β - [3,5-DIIODO-4-(3′,5′-DIIODO - 4′-HYDROXYPHENOXY)PHENYL]-α-METHYLALANINE (DL-α-METHYL THYROXINE)

DL - β - [3,5-diiodo-4-(4′-hydroxyphenoxy)phenyl]-α-methylalanine (2 g.) is dissolved in aqueous ethylamine (33%, 40 ml.) and treated with an excess of a solution containing 50.8 g. of iodine and 200 g. of potassium iodide in 250 ml. of water. Upon completion of the addition the reaction mixture is stirred for a further 35 minutes then adjusted to pH 4–5 with 16% hydrochloric acid. After stirring for 90 minutes the precipitate is filtered off and washed with water. The solid is taken up in a mixture of 25 ml. of ethanol and 10 ml. of 2N sodium hydroxide solution, treated with charcoal, and filtered. The filtrate is brought to boiling and to it is added, whilst hot, 2N HCl until the pH is between 4 and 5. The mixture is cooled and the residual crystals filtered off; M.P. 239° C. (dec.).

A specimen repurified by the above procedure melts at 240–242° C. (dec.).

Analysis.—Calcd. for $C_{16}H_{13}O_4NI_4$: C, 24.30; H, 1.66; N, 1.77%. Found: C, 24.64; H, 1.73; N, 1.75%.

The remaining products tabulated in Example XIII wherein at least one of $R_3$ and $R_4$ is hydrogen are converted to their respective iodo compounds.

By employing about one molar proportion of iodine and potassium iodide per mole of reactant in the case of those compounds wherein $R_3$ and $R_4$ are hydrogen, the respective triiodo compounds are obtained. For example, these triiodo compounds may be represented by the formula

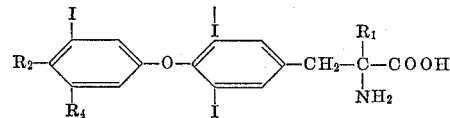

wherein $R_1$ is lower alkyl, $R_2$ is hydroxyl, and $R_4$ is hydrogen. As a specific compound produced by employing less than one molar proportion of iodine and potassium iodide may be mentioned α-methyl-3,3′,5-triiodothyronine.

EXAMPLE XV.—N-FORMYL DERIVATIVE OF DL-β - [3,5 - DIIODO - 4 - (4′-HYDROXYPHENOXY) PHENYL]-α-METHYLALANINE (N-FORMYL-DL-α-METHYL-3,5-DIIODOTHYRONINE)

To a solution of acetoformic anhydride (10 ml.) in pyridine (25 ml.) at 0° C. the title amino acid of Example XII is added portionwise during 20 minutes. The reaction mixture is allowed to come to room temperature and stirred for ½ hour. The reaction mixture is poured into water (300 ml.), acidified with 6N hydrochloric acid, and extracted with ethyl acetate (3 × 150 ml.). The combined extracts are washed successively with 1 N hydrochloric acid, water, 10% sodium bicarbonate solution and finally water. After filtration through sodium sulfate the ethyl acetate is removed in vacuo and the product dissolved in 100 ml. of 5% sodium bicarbonate solution and heated on the steam bath for ½ hour.

After cooling the solution is acidified with 1 N hydrochloric acid and the precipitate filtered off. The product is recrystallized from ethanol-water to give 5.08 g. of the N-formyl derivative; M.P. 216° C.

*Analysis.*—Calcd. for $C_{17}H_{15}O_5NI_2$: C, 36.00; H, 2.67; N, 2.47%. Found: C, 36.21; H, 2.74; N, 2.40%.

Repetition of this procedure but using 75 g. of the product of Example XII, 150 ml. of acetoformic anhydride in 375 ml. of pyridine, gives 66.8 g. (84.5% of theory) of the N-formyl derivative.

The remaining products of Example XIII are N-formylated in like manner.

EXAMPLE XVI 68 g. of the N-formyl derivative of Example XV is divided into two equal parts of 34 g. each, one of which is treated with d-α-methylbenzylamine and the other with 1-α-methylbenzylamine. From the main stream using d-α-methylbenzylamine 3.02 g. of (−)-N-formyl-β-[3,5-diiodo-4-(4′-hydroxyphenoxy)phenyl]-α-methylalanine is obtained, and from the complementary steam, using 1-α-methylbenzylamine, 1.94 g. of the (+)-N-formyl derivative.

As shown below, successive crops of crystals that are enriched in the more soluble salt are combined and the salt decomposed. The acid thus liberated is new resolved with the enantiomorphic base. Processing the material from the mother liquors of the initial resolution that led to the isolation of (−)-N formyl derivative gives 8.69 g. of the (+)-N-formyl derivative; complementarily 7.50 g. of the (−)-N-formyl derivative are obtained.

From the resolution of 68 g. of the title compound, a total of 10.52 g. of the (−)-N-formyl derivative and a total of 10.63 g. of the (+)-derivative are obtained. The yield on the resolution is thus 15% for each isomer (or 30% of theoretical).

Resolution of DL-N-formyl-β-[4-(4′-hydroxyphenoxy-3, 5-diiodophenyl]-α-methylalanine, using α-methylbenzylamine Salt formation.—An equimolar equivalent to the amine is added to a slurry of the acid in refluxing ethanol-water (1:2, 20 ml./g.), and the salt allowed to crystallize after filtration. The two initial resolutions each used 34.0 g. of the acid.

Resolutions.—Successive crops are obtained by concentration of mother liquors, and the last crop in each case by freeze-drying.

Liberation of the acid.—The salt is dissolved in about 50 parts of methanol, neutralized with cooling with 1 N hydrochloric acid and the acid precipitated with water (about 100 parts).

Unless otherwise stated, rotations are in methanol (c=1).

Isolation of the (−)-enantiomorph.—The progress of the resolution is shown in Table VI. Resolving agent: d-α-methylbenzylamine.

TABLE VI

| Cryst. No.: | Cryst. Ethanol, mls. | Solvent Water, mls. | 1st Crop, Wt. g.[α]$_D^\circ$ | 2nd Crop, Wt. g.[α]$_D^\circ$ | 3rd Crop, Wt. g.[α]$_D^\circ$ | 4th Crop, Wt. g.[α]$_D^\circ$ | 5th Crop, Wt. g.[α]$_D^\circ$ |
|---|---|---|---|---|---|---|---|
| A | 226 | 464 | −18.3 | 5.7+23.7 | | | |
| B | 233 | 467 | −14.7 | 3.4+20.9 | .65+13.9 | | |
| C | 193 | 267 | 11.6−48.0 | 10.2+28.9 | 3.49+24.1 | .12 | |
| D | 80 | 80 | 8.2−56.8 | 1.55−43.7 | 1.05+7.4 | .12 | (¹) |
| E | 60 | 60 | 6.3−60.2 | 1.43−54.8 | (¹) | | |
| F | 62.5 | 62.5 | 4.5−59.1 | 1.0−61.0 | (¹) | | |

¹ Negligible.

Crop F1 gave 3.40 g. of acid which is recrystallized from ethanol-water (3:5, 102 ml.) to give 3.02 g. of product as colorless feathery needles; M.P. 213.5–216° C., [α]$_D$−16.6°.

Crops A2, B2, B3, C2, C3, C4, D3, and D4 are combined and the acid liberated to give 19.0 g. of product (G). Removal of the methanol gives a further 780 mg., [α]$_D$+12.7° and freeze-drying of the filtrate gives 5.00 g. of a gum.

Crops D2 and E2 are combined and recrystallized from ethanol-water (1:1, 54 ml.) to give 2.04 g., [α]$_D$−57.4° (H).

Acid G′ is treated with d-α-methylbenzylamine (4.12 g.) to give 13.46 g. of salt, [α]$_D$−54.8° (I), which is combined with H and recrystallized in 1:1 ethanol-water as shown in Table VII. A second crop, I2, of 7.76 g., [α]$_D$+28.9° is obtained.

TABLE VII

| Cryst. No. | Volume, mls. | 1st Crop, Wt. g.[α]$_D^\circ$ | 2nd Crop, Wt. g.[α]$_D^\circ$ |
|---|---|---|---|
| J | 230 | 11.70−60.2 | 3.02−38.6 |
| K | 180 | 9.06−62.7 | 2.00−61.4 |
| L | 184 | 6.74−60.4 | 1.71−61.3 |

Crops K2, L1, and L2 are combined and the acid liberated, 7.47 g., which is recrystallized from ethanol-water (3:5, 350 ml.) to give 7.50 g.; M.P. 225° C. (dec.), [α]$_D$−17.4°.

*Analysis.*—Calcd. for: $C_{17}H_{15}I_2NO_5 \cdot 1/2C_2H_5OH$: C, 36.63; H, 3.05; N, 2.37; I, 43.01%. Found: C, 36.60; H, 3.01; N, 2.30; I, 42.88%.

Isolation of the (+)-enanthiomorph.—The progress of the resolution is shown in Table VIII. Resolving agent: 1-α-methylbenzylamine.

TABLE VIII

| Cryst. No.: | Cryst. Ethanol, mls. | Solvent Water, mls. | 1st Crop, Wt. g.[α]$_D^\circ$ | 2nd Crop, Wt. g.[α]$_D^\circ$ | 3rd Crop, Wt. g.[α]$_D^\circ$ | 4th Crop, Wt. g.[α]$_D^\circ$ | 5th Crop, Wt. g.[α]$_D^\circ$ |
|---|---|---|---|---|---|---|---|
| A′ | 226 | 464 | +2.0 | 5.7−20.9 | | | |
| B′ | 217 | 433 | +9.6 | 3.5−20.5 | .73−5.1 | | |
| C′ | 193 | 267 | 9.0+45.8 | 3.0+39.2 | 8.85−34.3 | 4.51−14.7 | .23 |
| D′ | 63 | 63 | 5.73+57.5 | 1.91+40.6 | .55−4.7 | (¹) | |
| E′ | 41 | 41 | 4.31+58.4 | .90+57.4 | (¹) | | |
| F′ | 40 | 40 | 3.08+58.6 | .72+58.9 | (¹) | | |

¹ Negligible.

Crop F′1 gave 2.11 g. of acid which is recrystallized from ethanol-water (3:5, 63 ml.) to give the product as feathery needles; M.P. 216.5–218.5° C., [α]$_D$+17.9° (1.94 g.).

Crops A′1, B′2, B′3, C′3, C′4, C′5, and D′3 are combined and the acid liberated (19.1 g., G′). Removal of the ethanol gives a further 695 mg. ($[\alpha]_D$—18.1°), and freeze-drying of the filtrate gives 4.60 g. of a gum.

Crops C′2, D′2, and E′2 are combined and recrystallized from ethanol-water (1:1, 87 ml.) to give 4.12 g., $[\alpha]_D$+57.5° (H′).

Acid G is treated with 1-α-methylbenzylamine (4.12 g.) to give 19.69 g. of salt $[\alpha]_D$+31.0° (I′), which is combined with H′ and repeatedly recrystallized from 1:1 ethanol-water as shown in Table IX. A second crop (I′2) of 2.56 g., $[\alpha]_D$—28.8° is obtained.

TABLE IX

| Cryst. No. | Volume, mls. | 1st Crop, Wt. g.$[\alpha]_D°$ | 2nd Crop, Wt. g.$[\alpha]_D°$ |
| --- | --- | --- | --- |
| J′ | 400 | 16.85+57.3 | 6.12—29.9 |
| K′ | 245 | 12.64+59.1 | 3.66+41.3 |
| L′ | 195 | 9.77+62.0 | 2.19+63.2 |

Crops L′1 and L′2 are combined and the acid liberated (8.63 g.), which is crystallized from ethanol-water (3:5, 370 ml.) to give 8.69 g.; M.P. 225° C. (dec.) $[\alpha]_D$+17.2° (c.=0.5 methanol).

*Analysis.*—Calcd. for: $C_{17}H_{15}I_2NO_5·1/2C_2H_5OH$: C, 36.63; H, 3.08; N, 2.37; I, 43.01%. Found: C, 36.41; H, 3.02; N, 2.33; I, 42.86%.

EXAMPLE XVII.—L-β-[3,5-DIIODO-4-(4′-HYDROXYPHENOXY)PHENYL]-α-METHYLALANINE (L-α-METHYL-3,5-DIIODOTHYRONINE)

The N-formyl group of the title product of Example XVI is removed by refluxing said compound for 1 hour with 15% hydrobromic acid. An equal volume of ethanol is then added and the hot solution treated with a saturated solution of sodium acetate until alkaline to Congo red. The L-acid separates on cooling and is collected.

EXAMPLE XVIII.—D-β-[3,5-DIIODO-4-(4′-HYDROXYPHENOXY)PHENYL] - α - METHYLALANINE (D-α-METHYL-3,5-DIIODOTHYRONINE)

N - formyl - DL - β-[3,5-diiode-4-(4′hydroxyphenoxy)phenyl]-α-methylalanine is subjected to the procedures of Examples XVI and XVII but using D-phenylethylamine in place of the L-isomer.

EXAMPLE XIX

The remaining DL-products of Example XIII are converted to their respective D- and L-isomers by the procedures of Examples XV–XVIII.

EXAMPLE XX

The D- and L-isomers of Examples XVII, XVIII, and XIX, wherein $R_3$ and/or $R_4$ are hydrogen are transformed to their respective polyiodo derivatives by the procedures of Example XIV.

EXAMPLE XXI.—D- AND L-β-[3,5-DIIODO-4-(3′,5′-DIIODO - 4′ - HYDROXYPHENOXY)PHENYL] - α-METHYLALANINE(L-α-METHYL THROXINE)

The procedures of Examples XV, XVI, and XVII are applied to DL-β-[3,5-diiodo-4-(3′,5′-diiodo-4′-hydroxyphenoxy)phenyl]-α-methylalanine to give the D- and L-isomers identical to the D- and L- products obtained in Example XX.

EXAMPLE XXII.—D - β - [3,5 - DIIODO-4-(4′-HYDROXYPHENOXY)PHENYL] - α - METHYLALANINE

D-N-formyl - β - [3,5-diiodo-4-(4′-hydroxyphenoxy) phenyl]-α-methylalanine (7.27 g.) is heated in refluxing 16% hydrobromic acid (140 ml.) for 75 minutes, ethanol (120 ml.) added, the solution heated to boiling again and basified to Congo red by addition of a hot saturated solution of sodium acetate. After cooling, the precipitate is collected (6.00 g., 87%); M.P. 269° C. (dec.), $[\alpha_D]$—13.6° (c.=0.5 in 2:1 ethanol-1 N hydrochloric acid).

This produce is used directly in the next stage or, if desired, purified further by the method of Example XXXIV. Its homogeneity is established by thin layer chromatography in the ethylacetate-diethylamine-water system. L-β-[3,5-diiodo-4-(4′-hydroxyphenoxy)phenyl]-α-methylalanine, is similarly obtained in 90% yields; M.P. 267° C. (dec.), $[\alpha]_D$+13.85 (c.=0.5 in 2:1 ethanol-1 N hydrochloric acid).

EXAMPLE XXIII.—D-β-[3,5 - DIIODO - 4 - (4′-HYDROXY-3′-IODOPHENOXY)PHENYL]-α - METHYLALANINE, D - α - METHYLTRIIODOTHYRONINE

D-β-[3,5 - diiodo - 4 - (4′-hydroxyphenoxy)phenyl]-α-methylalanine (3.146 g.), is dissolved in 33% aqueous ethylamine (31 ml.) and 7.86 ml. of a solution of iodine in aqueous potassium iodide (50.8 g. iodine and 200 g. potassium iodide in 250 ml. of solution) is added dropwise during 10 minutes with stirring. The stirring is continued a further 35 minutes after addition, when the reaction mixture is acidified to pH 4–5 with 6 N HCl with cooling. The precipitate is filtered off and washed with water (4.38 g).

The product is purified by counter-current distribution between mutually saturated n-butanol and 2 N-sodium hydroxide. The upper phase volume is 90 ml. and the lower phase 270 ml. The crude product is initially dissolved in 270 ml. of the lower phase. The course of the distribution is followed by placing 1 drop from each upper phase on filter paper and spraying (or dipping) the array with ferric chloride-potassium ferricyanide reagent (equal parts of 1% solutions). Twelve upper phases are used (#0–11) and 18 transfers of the lower phase are carried out, at which time the required material is centered around funnels #7–8. One quarter ml. aliquots of each upper phase is then applied to a thin layer chromatogram which is developed with ethyl acetate-diethylamine-water for 9–10 hours. The chromatogram indicated that tubes 5–11 contained only the required product. Tubes 2–4 are contaminated with tetraiodo-α-methyl-thyroxine, tube 1 contains only this amino acid, and tube 0 contains this amino acid together with some colored impurity.

Hexane (150 ml.) is added to each funnel and the layers equilibrated. Sodium hydroxide layers from funnels 6–11 are combined and the amino acid precipitated by acidification with concentrated hydrochloric acid. The precipitate is dissolved up again by heating to the boiling point and adding ethanol. The product is isolated by basification to Congo red while hot with hot saturated sodium acetate solution, and collecting the crystals obtained from the cooled mixture. There is obtained 2.609 g. (67%); M.P. 274.5° C. (dec.), $[\alpha]_D$ about —14° (c.=0.5, 2:1 ethanol-1 N-hydrochloric acid; $\lambda_{max}$=319 mμ (E 1% 64.5, 0.01 N methanol sodium hydroxide).

*Analysis.*—Found: Calcd. for: $C_{16}H_{14}I_3NO_4$. C, 28.90; H, 2.12; I, 57.26%. Found: C, 28.87; H. 2.34; I, 56.77%.

By means of this procedure the triiodo derivatives of the products of Examples XII, XIII, XVII–XX, wherein at least one of $R_3$ and $R_4$ is hydrogen, are obtained.

EXAMPLE XXIV.—D-5-(3,5-DINITRO-4-HYDROXYBENZYL)-5-METHYLHYDANTOIN

To 10 g. of the racemic hydrantoin compound suspended in water (150 ml.), 1-amphetamine (4.78 g.) in 10 ml. of methanol is added and the mixture stirred thoroughly. An additional 240 ml. of methanol is added and the solution set aside to crystallize. The solid which separates is collected and recrystallized from methanol-water (1:1) repeatedly until its melting point is above 243° C.

*Analysis.*—Calcd. for $C_{20}H_{23}O_7N_5$: C, 53.93; H, 5.20; N, 15.72%. Found: C, 53.87; H, 5.30; N, 15.5%.

The salt is decomposed by the addition of an excess of concentrated hydrochloric acid to a solution of the salt in ethanol-water (4:1). The d-isomer is filtered off, and dried; M.P. 307° C.

Repetition of the above procedure but using d-amphetamine in place of l-amphetamine gives the l-isomer.

EXAMPLE XXV

The D- and the L- 5-(3,5-dinitro-4-hydroxybenzyl)-5-methylhydantoins of Example XXIV are converted to D- and L- β-[3,5-diiodo-4-(3′,5′-diiodo-4′-hydroxyphenoxy)phenyl]-α-methylalanine by the procedures of Examples VII, VIII, IX, XI, XIIA and XIV.

EXAMPLE XXVI

Salt formation.—DL-β-[3,5-diiodo-4-(3′,5′-diiodo-4′-hydroxyphenoxy)phenyl]-α-methylalanine (200 mg.) is heated in 4 ml. of 10% sodium carbonate solution and filtered. The filtrate is brought to the boil again and cooled slowly to give crystals of the sodium salt.

Replacement of sodium carbonate by potassium carbonate, ammonium hydroxide, diethylamine, N,N′-dibenzylethylenediamine, monoethanolamine or calcium hydroxide produces the corresponding salt.

By means of this procedure, the products of Example XII–XXI are transformed to their corresponding salts.

EXAMPLE XXVII

To DL - β - [3,5 - diiodo-4-(3′,5′-diiodo-4′-hydroxyphenoxy)phenyl]-α-methylalanine in water is added an equivalent amount of hydrochloric acid and the mixture freeze-dried to give the HCl salt.

Application of this procedure to the products of Examples XII–XXIV converts them to their HCl-salts.

EXAMPLE XXVIII.—DL-N-ACETYL-α-METHYLTYROSINE

Acetic anhydride (456 ml.) is dissolved in pyridine (823 ml.) at 0° C., and to the solution DL-α-methyltyrosine (143.7 g.) is added portionwise at 0° C. The cooling bath is removed, the reaction mixture allowed to come to room temperature, then heated on a steam bath overnight. In the morning it is cooled in an ice bath and water (1500 ml.) added followed by concentrated hydrochloric acid. The precipitated O, N-diacetyl-α-methyltyrosine is filtered off and a portion (175 mg.) recrystallized from 1:1 water-ethanol (10 ml.) to give 137 mg.; M.P. 222–223° C.

Analysis.—Calcd. for $C_{14}H_{17}NO_5$: C, 60.20; H, 6.14; N, 5.02%. Found: C, 60.04; H, 6.26; N, 5.14%.

The bulk of the diacetyl derivative is dissolved in a mixture of 10% sodium hydroxide solution (500 ml.) and water (250 ml.) and heated on a steam bath for 30 minutes. The hot solution is filtered, water (250 ml.) added, and the product precipitated by the addition of concentrated hydrochloric acid whilst hot. After cooling, the crude product is filtered off and washed with water to give 170 g. of colorless crystals; M.P. 220.5–222° C. The DL-N-acetyl-α-methyltyrosine is recrystallized from 1:1 methanol-water (1400 ml.) and washed with water to give 141.1 g. (81.0%); M.P. 221–223° C. (partial dec.).

Analysis.—Calcd. for $C_{12}H_{15}NO_4$: C, 60.75; H, 6.37; N, 5.90%. Found: C, 60.86; H, 6.38; N, 5.87%.

Concentration of the mother liquors to about ⅓ volume yields a second crop of 18.9 g. (10.7%); M.P. 218.5–220.5° C. (partial dec.).

EXAMPLE XXIX.—D-N-ACETYL-α-METHYLTYROSINE

A.

Equimolar parts of DL-N-acetyl-α-methyltyrosine (10 g.) and brucine (16.6 g.) are dissolved in boiling water (35 ml.), the solution filtered, cooled and seeded. The salt is filtered off and recrystallized from water (85 ml.) to give 7.63 g. of the brucine salt of D-N-acetyltyrosine.

D-N-acetyltyrosine is obtained from the salt by dissolving the latter in the minimum volume of hot water, acidifying the solution with 1 N hydrochloric acid and collecting the product after cooling. The product is washed thoroughly with 1 N hydrochloric acid and water and dried at 100° C. in vacuo for at least one and one-half hours. The anhydrous acetamido acid melts at 240.5–241.5° C.; $[\alpha]_D^{22.0}+71.6°$ (c.=1.5 methanol).

Analysis.—Calcd. for: $C_{12}H_{15}NO_4$. C, 60.75; H, 6.37; N, 5.90%. Found: C, 61.08; H, 6.40; N, 5.78%.

B.

Equimolar parts of DL-N-acetyl-α-methyltyrosine (50 g.) and strychnine (70.5 g.) are dissolved in hot water (1600 ml.), the solution filtered and the filtrate cooled and seeded to give 48.3 g. of salt. The salt is recrystallized from water until the liberated N-acetyl-α-methyltyrosine has constant rotation. The L-N-acetyl-α-methyltyrosine is liberated from the salt by slurrying the latter in about 40 parts of water, basification of the slurry with 20% sodium hydroxide solution and filtering off the liberated strychnine after 2 hours. The filtrate is exhaustively extracted with chloroform, and then acidified (with cooling) with concentrated hydrochloric acid to give L-N-acetyl-α-methyltyrosine; M.P. 241–242° C.; $[\alpha]_D^{24.5}-70.2°$ (c.=1.9 methanol).

Analysis.—Calcd. for: $C_{12}H_{15}NO_4$. C, 60.75; H, 6.37; N, 5.90%. Found: C, 60.93; H, 6.42; N, 5.97%.

The mother liquor from the initial crystallization is concentrated to about 1200 ml., basified with 20% sodium hydroxide solution, the strychnine filtered off and washed with water. The combined filtrate and washings are extracted with chloroform (2× 300 ml.) and acidified with concentrated hydrochloric acid to precipitate predominantly D-N-acetyl-α-methyltyrosine which is recrystallized from 1:1 methanol-water to constant rotation.

EXAMPLE XXX.—D-N-ACETYL-3,5-DINITRO-α-METHYLTYROSINE

D-N-acetyl-α-methyltyrosine (29.0 g.) is added portionwise with stirring to concentrated nitric acid (290 ml.) during 20 minutes with the temperature being carefully regulated between 28–30° C. The mixture is then stirred for 2 hours at 29° C., poured into iced water (2000 ml.), the product filtered off and washed well with water to give D-N-acetyl-3,5-dinitro-α-methyltyrosine (20.6 g., 51.5%); M.P. 219° C. (dec.). This material is suitable for the next step. A small portion recrystallized from aqueous ethanol (5:1) had M.P. 221–222° C., $$[\alpha]_D^{22.7}+31.6°$$

(c.=1 methanol).

Analysis.—Calcd. for: $C_{12}H_{13}N_3O_8$. C, 44.04; H, 4.00; N, 12.84%. Found: C,43.91; H, 3.91; N, 12.87%.

L-N-acetyl-α-methyltyrosine (25.0 g.) similarly gives 18.5 g. (52%) of crude L-N-acetyl-3,5-dinitro-α-methyltyrosine; M.P. 218–220° C. (dec.). A sample recrystallized from aqueous isopropanol (1:1) melts at 218–220° C.; $[\alpha]_D^{23}-32.2°$ (c.=1 methanol).

Analysis.—Found: C, 43.90; H, 4.02; N, 12.88%.

DL-N-acetyl-α-methyltyrosine (1.0 g.) similarly gives 986 mg. (84.2%) of DL-N-acetyl-3,5-dinitro-α-methyltyrosine; M.P. 248° C.

Analysis.—Found: C, 44.42; H, 3.97; N, 12.91%.

EXAMPLE XXXI.—D-N-ACETYL-3,5-DINITRO-α-METHYLTYROSINE ETHYL ESTER

D-N-acetyl-3,5-dinitro-α-methyltyrosine (19.0 g.) is heated under reflux for 2 hours in ethanol (450 ml.) containing concentrated sulfuric acid (8.0 ml.). About one-half of the solvent is removed in vacuo, the concentrate poured into water (1500 ml.), and the product isolated by extraction into chloroform. Removal of the solvent yields a yellow gum (20 g.) which slowly crystallizes on standing. One gram of the residue is recrystallized from isopropanol-water (1:1, 50 ml.) to give D-N-acetyl-3,5-dinitro-α-methyltyrosine ethyl ester (720 mg.); M.P. 78–81° C., $[\alpha]_D^{24}+66.8°$ (c.=1 dioxane).

Analysis.—Calcd. for: $C_{14}H_{17}N_3O_8$. C, 47.32; H, 4.82; N, 11.83%. Found: C, 46.90; H, 4.90; N. 11.36%.

L-N-3,5-dinitro-α-methyltyrosine (18.5 g.) similarly gives 16.2 g. (80.5%) of crude L-N-acetyl-3,5-dinitro-α-methyltyrosine ethyl ester. A portion crystallized from aqueous isopropanol (2:1) has M.P. 75–79° C., $$[\alpha]_D^{23.6}-69.5°$$

(c.=1 dioxane).

Analysis.—Found: C, 46.61; H, 4.99; N, 11.54%.

DL-N-3,5-dinitro-α-methyltyrosine (15.8 g.) similarly gives 15.4 g. (89.7%) of crystalline DL-N-acetyl-3,5-dinitro-α-methyltyrosine ethyl ester; M.P. 178–180° C.

Analysis.—Found: C, 47.40; H, 4.82; N, 11.83%.

EXAMPLE XXXII.—D-N-ACETYL-β-[3,5-DINITRO-4-(4'-METHOXYPHENOXY)PHENYL]-α-METHYLALANINE ETHYL ESTER

D-N-acetyl-3,5-dinitro-α-methyltyrosine ethyl ester (12.0 g.) and toluenesulfonyl chloride (6.40 g.) are dissolved in pyridine (35 ml.) and heated under reflux for 10 minutes. After cooling somewhat, p-methoxyphenol (12.3 g.) in pyridine (20 ml.) is added and the reaction mixture heated under reflux for one hour, after which the pyridine was removed in vacuo. The product is isolated by crystallizing the residual syrup from a mixture of water (150 ml.), acetic acid (100 ml.) and isopropanol (50 ml.) to give 11.7 g. (75%); M.P. 89.5–91° C., $[\alpha]_D^{24.5}+103°$ (c.=1 dioxane) of D-N-acetyl-β-[3,5-dinitro-4-(4'-methoxyphenoxy)phenyl]-α-methylalanine ethyl ester.

Recrystallization of 1.24 g. from the mixture of water (30 ml.), acetic acid (30 ml.) and isopropanol (10 ml.) gives 1.0 g. of product; M.P. 96.5–99° C.

Analysis.—Calcd. for: $C_{21}H_{23}N_3O_9$. C, 54.66; H, 5.02; N, 9.11%. Found: C, 54.47; H, 4.90; N, 8.76%.

L-N-acetyl-3,5-dinitro-α-methyltyrosine ethyl ester (5.4 g.) similarly gives 4.68 g. (68%) of recrystallized L-N-acetyl-β-[3,5-dinitro-4-(4'-methoxyphenoxy)phenyl]-α-methylalanine ethyl ester; M.P. 95.5–97° C., $[\alpha]_D^{21.9}-103°$ (c.=1 dioxane).

Analysis.—Found: C, 54.15; H, 5.14%.

DL-N-acetyl-3,5-dinitro-α-methyltyrosine ethyl ester (3.1 g.) similarly gives 2.43 g. (65%) of crystalline DL-N-acetyl-β-[3,5-dinitro-4-(4'-methoxyphenoxy)phenyl]-α-methylalanine ethyl ester; M.P. 167–169° C.

Recrystallization of 500 mg. from a mixture of water (26 ml.), glacial acetic acid (13 ml.) and isopropanol (2 ml.) gives 350 mg. of material; M.P. 169.5–170.5° C.

Analysis.—Found: C, 54.67; H, 5.50; N, 9.32%.

EXAMPLE XXXIII.—D-N-ACETYL-β-[3,5-DIIODO-4-(4'-METHOXYPHENOXY)PHENYL]-α-METHYLALANINE ETHYL ESTER

D-N-acetyl-β-[3,5-dinitro-4-(4'-methoxyphenoxy)phenyl]-α-methylalanine ethyl ester (10.0 g.) in glacial acetic acid (100 ml.) is reduced with hydrogen (40 p.s.i.) in the presence of 10% palladium-on-charcoal (0.5 g.). The catalyst is filtered off and the solution (kept under nitrogen) is added during 15 minutes to a stirred solution of sodium nitrite (9.50 g.) in concentrated sulfuric acid (120 ml.) and glacial acetic acid (60 ml.) at −5 to 5° C. After the addition the mixture is stirred for 1 hour at 0° C. and then added while still cold to a solution of sodium iodide (39.0 g.) and iodine (29.0 g.) in water (450 ml.) at such a rate that the temperature is held between 25 and 28° C. (25 min.). Stirring is continued for an additional hour after addition with the temperature maintained at 25–28° C. The product is extracted into ethyl acetate (3× 300 ml.), and the combined extracts washed with 10% sodium bisulfite solution (5× 200 ml.), water (4× 200 ml.), dried by percolation through sodium sulfate and the solvent removed. The residual gum is crystallized from water (90 ml.), glacial acetic acid (100 ml.) and isopropanol (30 ml.) to give 8.57 g. (61.2% of D-N-acetyl-β-[3,5-diiodo-4-(4'-methoxyphenoxy)phenyl]-α-methylalanine ethyl ester; M.P. 129–130° C., $[\alpha]_D^{24.5}+27.4°$ (c.=1 dioxane).

Analysis.—Calcd. for: $C_{21}H_{13}I_2NO_5$. C, 40.47; H, 3.72; N, 2.25%. Found: C, 40.57; H, 3.76; N, 2.26%.

Recrystallization of the product from water (50 ml.), acetic acid (50 ml.), and isopropanol (15 ml.) gives 7.34 g.; M.P. 131–132° C., $[\alpha]_D^{24.0}+26.1°$ C. (c.=1 dioxane).

L-N-acetyl-β-[3,5-dinitro-4-(4'-methoxyphenoxy)phenyl]-α-methylalanine ethyl ester (3.5 g.) similarly gives 3.04 g. (64%) of L-N-acetyl-β-[3,5-diiodo-4-(4'-methoxyphenoxy)phenyl]-α-methylalanine ethyl ester; M.P. 135–137° C., $[\alpha]_D^{25}-27.8°$ (c.=1 dioxane).

Analysis.—Found: C, 40.53; H, 3.81; N, 2.47%.

DL-N-acetyl-β-[3,5-dinitro-4-(4'-methoxyphenoxy)phenyl]-α-methylalanine ethyl ester (2.0 g.) gives 1.66 g. (62%) of crystalline DL-N-acetyl-β-[3,5-diiodo-4-(4'-methoxyphenoxy)phenyl]-α-methylalanine ethyl ester which is isolated by chromatography on alumina (100 g.) of the crude reaction product (2.60 g.), the desired product being eluted by ethyl acetate benzene (1:1).

Recrystallization of 1.20 g. of the above product from aqueous isopropanol (1:1, 32 ml.) gives 720 mg. of material; M.P. 156.5–157.5° C.

Analysis.—Found: C, 40.55; H, 3.81; N, 2.26%.

EXAMPLE XXXIV.—D-β-[3,5-DIIODO-4-(4'-HYDROXYPHENOXY)PHENYL]-α-METHYLALANINE

D-N-acetyl-β-[3,5-diiodo-4-(4'-methoxyphenoxy)phenyl]-α-methylalanine ethyl ester (6.00 g.) is heated under reflux in a mixture of 57% hydriodic acid (84 ml.) and the glacial acetic acid (84 ml.) for 4 hours. Water (400 ml.) and sodium metabisulfite (2.5 g.) are added and the mixture heated to boiling. Ethanol (300 ml.) is added, traces of insoluble impurities filtered off, and the hot filtrate made alkaline to Congo red with a saturated solution of sodium acetate. Filtration of the cooled mixture yields 4.26 g.; M.P. 275° C. of colorless crystals. D-β-[3,5-diiodo-4-(4'-hydroxyphenoxy)phenyl]-α-methylalanine is recrystallized by the addition of a saturated solution of sodium acetate to a hot solution of the amino acid in aqueous (150 ml.) ethanol (150 ml.) containing concentrated hydrochloric acid (5 ml.) to give 4.07 g. (74.6%); M.P. 282° C., $[\alpha]_D^{25}-14.1°$ (c.=12:1 ethanol-1 N hydrochloric acid).

Hydrolysis of L-N-acetyl-β-[3,5-diiodo-4-(4'-methoxyphenoxy)phenyl]-α-methylalanine ethyl ester (500 mg.) similarly gives 255 mg. of L-β-[3,5-diiodo-4-(4'-hydroxyphenoxy)phenyl]-α-methylalanine; M.P. 281° C., $$[\alpha]_D^{22.8}+14.5°$$

(c.=0.75 2:1 ethanol-1 N hydrochloric acid).

Hydrolysis of DL-N-acetyl-3-[3,5-diiodo-4-(4'-methoxyphenoxy)phenyl]-α-methylalanine ethyl ester similarly gives 120 mg. of crude DL-β-[3,5-diiodo-4-(4'-hydroxyphenoxy)phenyl]-α-methylalanine; M.P. 275° C., which is raised to 282° C. on recrystallization.

EXAMPLE XXXV.—METHYL ESTER OF β-[3,5-DIIODO-4-(4'-HYDROXY-3'-IODOPHENOXY) PHENYL]-α-METHYLALANINE

Methyl ester of α-methyltriiodothyronine.—α-Methyltriiodothyronine (5 g.) is slurried in methanol (500 ml.) and the mixture cooled to 0°–5° C. Thionyl chloride (75 ml.) is then added dropwise over a 30-minute period. The resulting solution was stirred at room temperature for one hour then refluxed for five hours and allowed to stand overnight at room temperature. Removal of the volatiles under reduced pressure gives a residue which is taken up in methanol (150 ml.). Water (150 ml.) is added and the pH of the mixture adjusted to 7.1 with saturated aqueous sodium bicarbonate solution.

The precipitate which forms, along with some gummy material, is extracted with chloroform (3× 150 ml.), the combined chloroform extracts dried (anhydrous sodium sulfate), decolorized, filtered and evaporated to dryness in vacuo to give a white solid. The solid is dissolved in ether (200 ml.), the solution treated with charcoal, filtered and taken to dryness in vacuo. The white solid residue is recrystallized from ethyl acetate-hexane (30 ml.–75 ml.).

Repetition of this procedure but using ethyl, n-propyl, isopropyl and n-butyl alcohols, phenol, o-, m-, and p-chlorophenols, o-bromophenol, p-iodophenol, o- and p-methyl phenols, m-ethylphenol, p-butylphenol in place of methanol produces the corresponding (lower)alkyl, phenoxy, halogen substituted phenoxy and (lower) alkyl substituted phenoxy esters.

EXAMPLE XXXVI

Application of the procedure of Example XXXV to the products of Examples XII–XIV, XVII–XXIII and XXXIV affords the corresponding lower alkyl esters having the formula

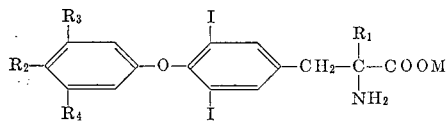

wherein $R_1$ is lower alkyl, $R_2$ is selected from the group consisting of hydroxy, lower alkoxy, cycloalkoxy containing from 3 to 6 carbon atoms, and halogen, each of $R_3$ and $R_4$ is individually selected from the group consisting of hydrogen, lower alkyl and halogen, and M is lower alkoxy, halo and (lower) alkyl phenoxy.

EXAMPLE XXXVII.—AMIDE OF β-[3,5-DIIODO-4-(4'-HYDROXY-3'-IODOPHENOXY)PHENYL]-α-METHYLALANINE AMIDE OF α-METHYLTRIIODOTHYRONINE

α-Methyltriiodothyronine (5 g.) is slurried in benzene (500 ml.) and the mixture cooled to 0°–5° C. Thionyl chloride (75 ml.) is then added dropwise over a 30-minute period. The reaction mixture is stirred at room temperature for one hour then refluxed for five hours and allowed to stand at room temperature overnight. The acid chloride is obtained by removal of the volatiles under reduced pressure.

The acid chloride is taken up in methanol and added dropwise to a cold (5°–10° C.) concentrated aqueous solution of ammonia (five fold excess is used) at such a rate that one of the ammonium chloride escapes from the reaction flask. After standing overnight the volatiles are removed under reduced pressure and the product extracted with dry ethyl acetate. Removal of the ethyl acetate provides the desired product.

Application of this procedure to the products of Examples XII–XIV, XVII–XXIII and XXXIV affords the corresponding amides which may be represented by the formula

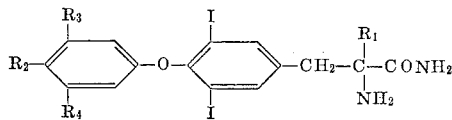

wherein $R_1$ is selected from the group consisting of (lower) alkyl and cycloalkyl; $R_2$ is selected from the group consisting of hydroxy, halogen, (lower alkoxy and cycloalkoxy, and $R_3$ and $R_4$ are each selected from the group consisting of hydrogen, halogen and (lower) alkyl. For example, there may be mentioned the amides of α-methyl-3,5-diiodothyronine and α-methylthyroxine.

EXAMPLE XXXVIII

The acid chloride of α-methyltriiodothyronine is prepared according to the procedure of Example XXXVII. The acid chloride is diluted with benzene, cooled to 10°–15° C. and an excess (at least 2 molar) of an amine of the formula H—$NR_5R_6$, wherein $R_5$ and $R_6$ are each selected from the group consisting of hydrogen, (lower) alkyl and hydroxy (lower) alkyl, added in benzene solution. The rate of addition is regulated so that the temperature remains below 15° C. Similarly piperidine is used to form the piperidide derivatives.

The reaction mixture is then extracted twice with water followed by dilute (6%) hydrochloric acid. Evaporation of the benzene solution yields the amide derivative.

By means of this procedure the products of Examples XII–XIV, XVII–XXIII and XXXIV are converted to amides of the formula

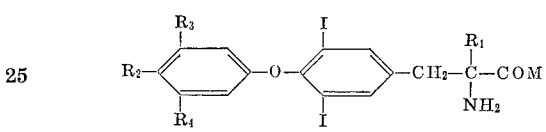

wherein $R_1$ is selected from the group consisting of (lower) alkyl and cycloalkyl; $R_2$ is selected from the group consisting of hydroxy, halogen, (lower) alkoxy and cycloalkoxy; $R_3$ and $R_4$ are each selected from the group consisting of hydrogen, halogen and (lower) alkyl, and M is selected from the group consisting of piperidyl, and $NR_5R_6$ wherein $R_5$ and $R_6$ are each hydrogen, (lower) alkyl and hydroxy (lower) alkyl.

What is claimed is:

1. A compound of the formula

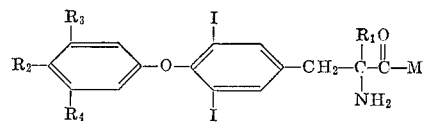

wherein $R_1$ is selected from the group consisting of lower alkyl which may be straight chained or branched and cycloalkyl having from 3 to 6 carbon atoms;

$R_2$ is selected from the group consisting of hydroxy, halogen, cycloalkoxy containing from 3 to 6 carbon atoms and lower alkoxy;

each of $R_3$ and $R_4$ is individually selected from the group consisting of hydrogen, halogen and lower alkyl;

M is selected from the group consisting of hydroxy, lower alkoxy, phenoxy, halogen substituted phenoxy, lower alkyl substituted phenoxy, piperidyl and $NR_5R_6$ wherein each of $R_5$ and $R_6$ is individually selected from the group consisting of hydrogen, lower alkyl and hydroxy lower alkyl;

and the pharmaceutically acceptable salts of those compounds wherein M is hydroxy.

2. The compound of claim 1 wherein $R_1$ is lower alkyl, $R_2$ is hydroxy, $R_3$ and $R_4$ are iodo, and M is hydroxy.

3. The compound of claim 1 wherein $R_1$ is lower alkyl, $R_2$ is hydroxy, $R_3$ is hydrogen, $R_4$ is iodo and M is hydroxy.

4. The compound of claim 1 wherein $R_1$ is lower alkyl, $R_2$ is hydroxy, $R_3$ and $R_4$ are hydrogen, and M is hydroxy.

5. The compound of claim 1 wherein $R_1$ is cycloalkyl, $R_2$ is hydroxy, $R_3$ is hydrogen, $R_4$ is iodo, and M is lower alkoxy.

6. The compound of claim 1 wherein $R_1$ is methyl, $R_2$ is hydroxy, $R_3$ is iodo, $R_4$ is hydrogen and M is methoxy.

7. The compound of claim 1 wherein $R_1$ is methyl, $R_2$ is hydroxy, $R_3$ and $R_4$ are iodo and M is ONa.

8. The compound of claim 1 wherein $R_1$ is propyl, $R_2$ is methoxy, $R_3$ is iodo, $R_4$ is hydrogen and M is hydroxy.

9. The compound of claim 1 wherein $R_1$ is methyl, $R_2$ is hydroxy, $R_3$ is iodo, $R_4$ is hydrogen and M is $NH_2$.

References Cited

UNITED STATES PATENTS 3,017,428　1/1962　Jorgensen ---------- 260—519

LORRAINE A. WEINBERGER, *Primary Examiner.*

L. A. THAXTON, *Assistant Examiner.*